United States Patent
Herrick et al.

(10) Patent No.: US 11,873,881 B1
(45) Date of Patent: Jan. 16, 2024

(54) CABLE GRIPPER INSERT

(71) Applicant: RODDIE, INC., Columbia Falls, MT (US)

(72) Inventors: Rod Herrick, Whitefish, MT (US); Jared W Shappell, Kalispell, MT (US)

(73) Assignee: RODDIE, Inc., Columbia Falls, MT (US)

( * ) Notice: Subject to any disclaimer, the term of this patent is extended or adjusted under 35 U.S.C. 154(b) by 0 days.

(21) Appl. No.: 17/392,003

(22) Filed: Aug. 2, 2021

Related U.S. Application Data

(63) Continuation of application No. 15/681,048, filed on Aug. 18, 2017, now Pat. No. 11,105,392.
(60) Provisional application No. 62/377,492, filed on Aug. 19, 2016.

(51) Int. Cl.
  *F16G 11/04* (2006.01)
  *F16B 2/00* (2006.01)

(52) U.S. Cl.
  CPC ............ *F16G 11/044* (2013.01); *F16B 2/005* (2013.01)

(58) Field of Classification Search
  CPC ...... F16G 11/044; F16G 11/048; F16B 2/005; Y10T 24/3969; Y10T 403/7054; Y10T 403/7058
  See application file for complete search history.

(56) References Cited

U.S. PATENT DOCUMENTS

| | | | |
|---|---|---|---|
| 3,058,386 A * | 10/1962 | Morrow | F16B 9/056 403/368 |
| 3,902,228 A | 9/1975 | Caradot | |
| 4,055,875 A | 11/1977 | Strickalnd | |
| 5,369,849 A * | 12/1994 | De France | F16G 11/048 24/115 M |
| 5,511,909 A * | 4/1996 | Calandra, Jr. | E21D 21/0046 405/259.1 |
| 6,626,610 B1 * | 9/2003 | Seegmiller | E21D 21/006 405/259.4 |
| 6,793,442 B2 | 10/2004 | Carter et al. | |
| 6,799,923 B2 | 10/2004 | Carter et al. | |
| 8,425,143 B2 * | 4/2013 | Kondo | F16G 11/02 403/368 |
| 10,533,632 B1 * | 1/2020 | Herrick | F16G 11/048 |
| 2004/0146361 A1 | 7/2004 | Hau | |

OTHER PUBLICATIONS

Web Page Ad: TerraTrenchlessTechnologies: http://www.terra-eu.eu/seiten_de/produkte-pxp-8-15.html.

* cited by examiner

*Primary Examiner* — Robert Sandy
*Assistant Examiner* — Rowland Do
(74) *Attorney, Agent, or Firm* — Robin Kelson Consulting, Inc.

(57) ABSTRACT

Cable gripper jaws and cable gripper jaw members having at least one removable, cable gripping surface insert. The gripper jaw member has a recess for receiving the insert and the insert can engage with the gripper member by means of a fixative and/or a mechanical engaging means, including mechanical interlocking means. The insert and gripper member can be of different materials, including metals of differing hardness ratings. The cable gripper jaws have utility in the cable gripping fields, including in the drilling and horizontal directional drilling industries, and as part of a method for pulling cable through space, including pulling cable through space in the pipe bursting and trenchless pipe replacement industries.

7 Claims, 6 Drawing Sheets

CABLE GRIPPER INSERT

CROSS REFERENCE TO RELATED APPLICATIONS

This application claims the benefit of U.S. patent application Ser. No. 15/681,048, filed Aug. 18, 2017, which claims the benefit of Provisional Application No. 62/377,492, filed Aug. 19, 2016, the disclosures of which are hereby expressly incorporated in their entirety by reference herein.

FIELD OF USE

Embodiments of the present disclosure find applicability in the field of cable clamping and cable gripping mechanisms for gripping cable being pulled through space. Useful industries that use cable gripping mechanisms are the drilling industries, including the vertical and horizontal directional drilling industries; the cable and conduit laying industries; towing industries, and other industries where cable is pulled through space above or below ground, including the pipe bursting and trenchless pipe replacement industries.

BACKGROUND

It is common practice in fields and industries that require pulling metal cable through space to use a cable gripping mechanism. One common, useful mechanism includes using a gripper having metal "teeth" to bite the cable and hold it in position. These metal grippers or "jaws" typically are manufactured as a single, integral unit, generally from a ferrous metal such as steel, that is both soft enough to absorb and sustain the load that cable pulling requires, and hard enough that the cable gripping surface, typically textured in some way to provide the teeth, can bite into and hold the cable.

One exemplary industry that uses cable gripping "jaws" is the horizontal directional drilling industry. Here, cable is pulled through space using thrust and pull back forces in the range of at least about 5,000-100,000 lbs. Vertical drilling systems can use even greater force. Other industries include towing industries, particularly those that tow heavy items, including vehicles, boats, ships, and the like. Still other industries are those that lay large conduit, cable and/or pipe above or below ground, including the pipe bursting and trenchless pipe replacement industries.

The dual function required of a cable gripper (high load capacity and high hardness for cable gripping) generally requires selecting a metal that is a compromise between the two ideals of high load capacity and high hardness. This need to compromise between two different metal characteristics can limit the overall life of the gripper. Typically, an upper limit is placed on the choice of metal hardness, driven by the load-bearing requirements of the gripper. This choice generally results in the cable gripping surface wearing down over time, requiring the whole gripper to be replaced even though the rest of the gripper's functions, including its load bearing capability, remain operative and functional. Replacing the whole gripper is both costly and time-consuming for the consumer, and also expensive and time-consuming for the manufacturer to fabricate.

In the field of horizontal directional drilling, for example, a standard metal commonly used to fabricate cable grippers is E9310. E9310 is a low alloy steel that can be hardened to a surface Rockwell hardness of up to about 62, while maintaining a more desired, lower internal Rockwell hardness for load capacity. While functional and useful, this single metal has an upper limit to its surface hardness, which limits the life of the gripper's cable gripping surface.

There remains a need for a metal cable gripper that can have both a desired high hardness on its cable gripping surface and a desired lower hardness on its inner, load-bearing surface without having to compromise on metal choices, or limit the life of the gripper. There also remains a need for a metal cable gripper having a cable gripping surface that is more resistant to wear than the cable grippers currently in the art.

The present disclosure describes improvements in metal cable gripping mechanisms and methods of use thereof that overcome deficiencies in the mechanisms and devices of the prior art.

SUMMARY

This summary is provided to introduce a selection of concepts in a simplified form that are further described below in the Detailed Description. This summary is not intended to identify key features of the claimed subject matter on its own, nor is it intended to be used on its own as an aid in determining the scope of the claimed subject matter.

In accordance with one embodiment of the disclosure, provided herein is a novel cable gripper or "jaw" having an axially concave surface dimensioned and configured to engage a cable. The cable engaging surface typically is threaded, grooved, or otherwise textured to provide means for gripping or "biting" into the cable. In one embodiment, useful cable jaws comprise a plurality of two or more gripper members whose inner cable gripping surfaces together define an axial hole dimensioned to receive a cable.

Cable gripping mechanisms are used in a wide range of environments and accordingly the overall shape of the gripper can vary, according to the location and functionality of the gripper relative to an overall cable pulling apparatus. In one embodiment, the outer surface of the cable gripper device contacts another component of a cable pulling apparatus, and its outer surface is configured to support that contact. Thus, for example, when the gripper fits inside a substantially hollow housing and slides against the inner surface of the housing, the outer surface of the gripper device can have a convex shape to provide a camming surface that can slide against the housing's inner surface. One example of hollow housing is a bursting head housing. U.S. Pat. No. 9,360,148 the disclosure of which is incorporated herein by reference, provides a more detailed description of bursting head devices. In another embodiment the device can have a shape and mechanical linkage means for promoting sliding along a part of the cable pulling apparatus. U.S. patent application Ser. No. 14/726,546, the disclosure of which is incorporated herein by reference, provides a more detailed description of cable gripper jaws for cable pulling apparatuses.

Cable grippers of the instant disclosure differ from grippers of the art in that the gripper's cable gripping surface comprises at least one removable insert that sits in a recess of the gripper body or gripper base. When in position, the insert provides the means for gripping the cable. In one embodiment, the cable gripping means of the grippers of this disclosure comprise a single insert. In another embodiment, the cable gripping means comprises a plurality of two or more inserts. In still another embodiment, the insert and gripper body or base are composed of two different metals.

In one embodiment, the inserts are spaced along the axial length of the recess.

In another embodiment, the gripper insert has a substantially concave upper or "inner" cable gripping surface and a lower, or "outer" gripper base-engaging surface. In still another embodiment, the insert's base-engaging surface is dimensioned and configured to mirror the gripper base's recess surface.

In one embodiment, the recess in the gripper base that is dimensioned to receive and engage the gripper insert is curved, or has a substantially concave surface. In another embodiment the outer surface of the gripper insert also is curved and has a substantially convex surface that mirrors the gripper base recess shape.

In another embodiment the gripper base recess surface is substantially flat. In still another embodiment the insert engages mechanically with the base. In one embodiment the mechanical engaging means acts as a mechanical lock. In one embodiment the lock can comprise a boundaried channel into which the insert is set. In still another embodiment, the lock can comprise a longitudinal series of boundaries or channels into which a plurality of inserts are set. In still another embodiment, the boundaries defining the length of the insert channels comprise dividers or steps such that the inserts sit in individual channels in the recess, separated from one another and held in position by the dividers or steps. In still another embodiment the dividers are competent to hold the inserts in position during the thrust and pullback actions of a cable pulling operation. In still another embodiment the cable engaging surface of the dividers also is threaded, grooved or otherwise textured to bite the cable.

In yet another embodiment the mechanical engaging means comprises an interlocking mechanism. In one embodiment the interlocking mechanism can comprise a dovetail type joint. In still another embodiment the mechanical interlocking mechanism can comprise a mortise and tenon type joint. In still another embodiment the mechanical interlocking mechanism can comprise a tongue and groove type joint.

In another embodiment the gripper device can include an insert position retaining means. In one embodiment the position retaining means can be mechanical, including, without limitation, a pin, screw, or bolt. In another embodiment, the position retaining means can include an fixative, adhesive or sealant, including, without limitation, epoxy or silicone.

In still another embodiment the gripper base can be configured to retain the insert in position and limit longitudinal shifting of the gripper insert during the cable pulling operation. In still another embodiment the gripper base comprises means for absorbing the load placed on the gripper insert during cable pulling operation. In one embodiment, the gripper comprises a bracing means that acts as a back stop for the insert during operation. Where a plurality of gripper inserts are provided the channel dividers or insert boundaries can provide the bracing or backstop means. Where a single gripper insert is provided, a shelf or wall can provide the bracing or backstop means.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Embodiments of the present disclosure provide devices, components, mechanisms and methods of use directed to improved means for gripping a cable surface, particularly a cable to be pulled through space. The improvement comprises providing a removable and replaceable cable gripping surface to a cable gripping device. The removable and replaceable gripping surface can be provided by means of an insert which may be made of a different material than that of the gripper base or gripper body. The insert also may be secured or otherwise engaged with the gripper body by any suitable means. One useful means can be by mechanical means, including mechanical locking or interlocking means. Other means can include fixatives, adhesives and/or sealants. In one preferred embodiment, the mechanical securing means can include mechanical means for engaging the insert with the gripper base, mechanical insert position retaining means, and a mechanical load bearing brace for absorbing pulling forces on the gripper insert during operation.

Figure 1:
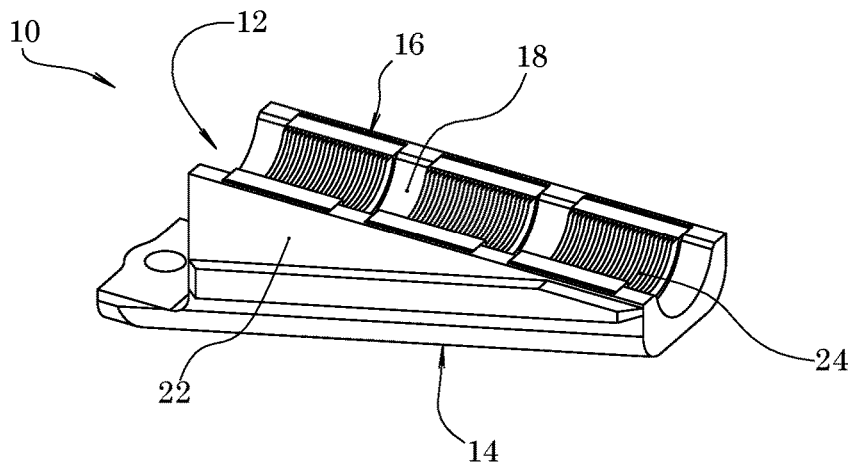
FIG. 1 is a perspective view of a cable gripper member comprising a plurality of gripper inserts, according to one embodiment of the present disclosure.
Figure 2:
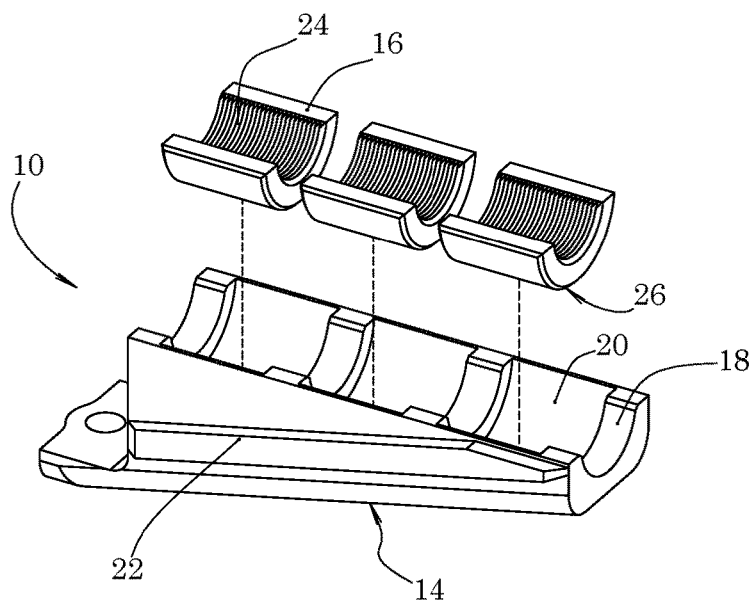
FIG. 2 is an exploded view of the cable gripper member of FIG. 1.

Referring to FIGS. 1 and 2, one embodiment of a useful cable gripping mechanism and device in accordance with the present disclosure is shown. In the figures, a cable gripper member 10 is shown. In the embodiment illustrated in FIGS. 1 and 2 the gripper member has an overall wedge shape and the member shown comprises one half of a gripper device, the other half being a substantial mirror of the half shown. The gripper itself, comprising the two halves, also has an overall wedge shape. Gripper member 10 comprises a gripper body or gripper base 22 having an outer or lower surface 14 and inner, or upper surface 12. Upper surface 12 has a cable gripping surface provided by a cable gripper insert 16. When two of the cable members shown in FIG. 1 are placed together such that their cable gripping surfaces face each other, the inner, cable gripping surfaces together define a hollow opening or tube dimensioned to receive a cable.

Cable gripping surface 12 comprises at least one insert 16 that sits in a recess of cable base 22. Accordingly, gripper base upper surface 12 comprises means for receiving and engaging a cable gripping insert. In the embodiment illustrated in the figures, three inserts are shown. As will be appreciated by those skilled in the art, fewer inserts, including two or one, and more inserts, can be used to advantage.

Recess 20 is configured to receive and mechanically engage insert 16. Insert 16 itself comprises an outer or lower, gripper base-engaging surface 26 dimensioned and configured to sit in recess 20, and an inner or upper, cable engaging surface 24, typically textured to enhance the surface's ability to dig into or "bite" the cable. One common means for creating a "biting" texture on a cable gripping surface is by forming a threaded or grooved texture on the cable gripping surface.

In the figures the gripper base insert receiving, upper surface comprises one or more recesses 20 dimensioned to receive the insert. In the figures the insert recess surface comprises a series of recesses or channels dimensioned to receive the individual inserts. The channels, and the inserts they hold, can be separated by dividers or steps in the recess axial opening and which provide a mechanical engaging or locking means for holding each insert in place. In the figures the channels 20 are depicted as concave and the outer or lower surface 26 of the inserts is a mirror image thereof, namely convex. Dividers 18 can provide mechanical means for holding the insert(s) in position in recess 20. Dividers 18 also can provide load bearing bracing means for absorbing pulling forces on the gripper insert during operation. The cable engaging surface of dividers 18 also can be configured to engage the cable. For example, the surfaces can be textured, e.g., grooved, to bite into the cable they contact.

The embodiment depicted in FIG. 3 is a three-member gripper device having an overall cone shape. These gripper devices have utility as part of the gripping mechanism in a bursting head cone commonly used in horizontal directional drilling. As for the wedge-shaped gripper members shown in FIGS. 1 and 2, when the members of the cone-shaped gripper are put together, their inner, cable gripping surfaces together define an axial opening or channel configured and dimensioned to receive a cable.

Figure 3A:
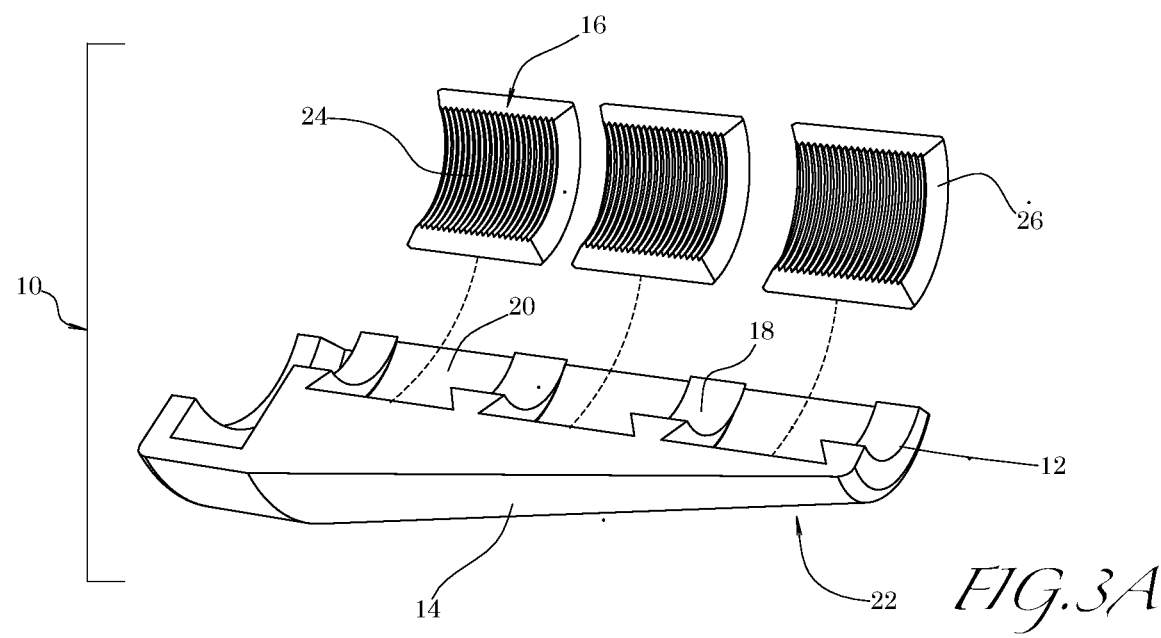
FIGS. 3A and 3B are views of cable gripper members comprising a plurality of gripper inserts according to another embodiment of the present disclosure, wherein 3A is an exploded view, and 3B shows three gripper members with integrated gripper inserts.
Figure 3B:
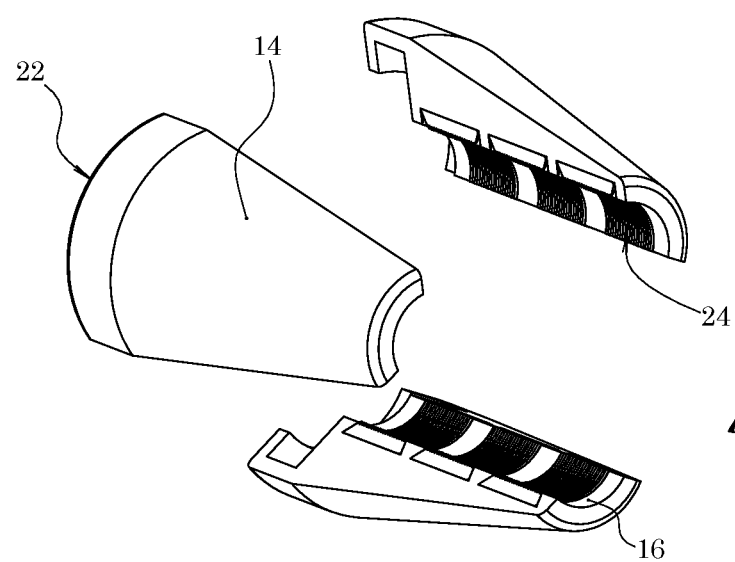

In FIGS. 3A and 3B channel dividers 18 that comprise the mechanical engaging or locking means are configured as dovetails, as are the lateral edges of insert 16, such that the inserts can slide into recesses 20 and interlock with dividers 18 as a dovetail type joint.

In FIGS. 4-10, embodiments of gripper members 10 comprising a single insert 16 are illustrated. In the figures the single insert sits along the central, longitudinal axis of gripper base 22. In the embodiments illustrated in FIGS. 4-7, the mechanical engaging or locking means comprises a dovetail type joint that extends along the central longitudinal axis of the insert and the gripper base. In the case of the gripper insert, the dove tail 28 can extend down from the outer or lower surface 26 of the insert and can mirror a dovetail channel or recess 20 in upper or inner surface 12 of gripper base 22, extending along the gripper base's centrally located longitudinal axis.

Figure 4:
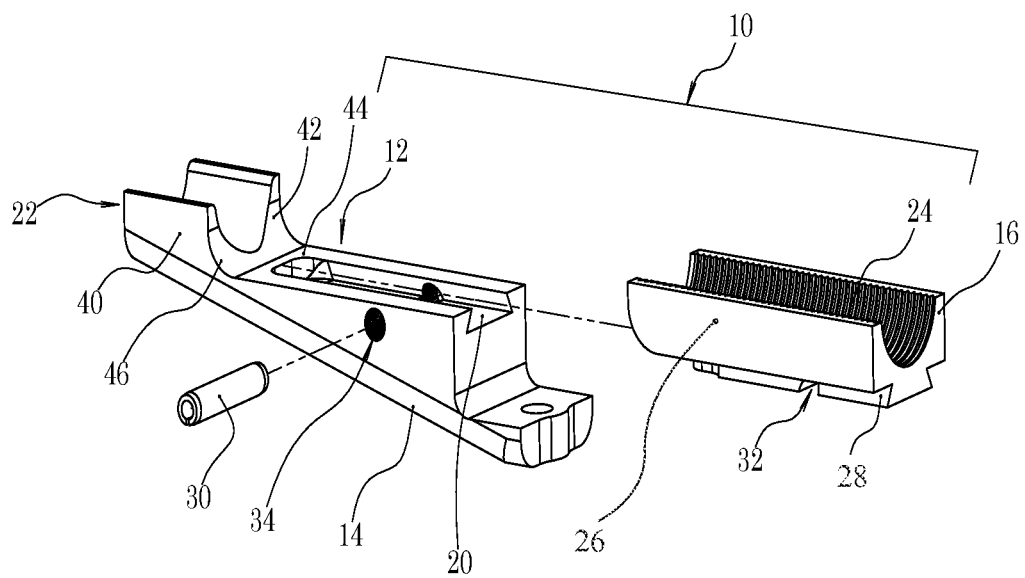
FIG. 4 is an exploded view of a cable gripper member comprising a gripper insert according to another embodiment of the present disclosure.
Figure 5:
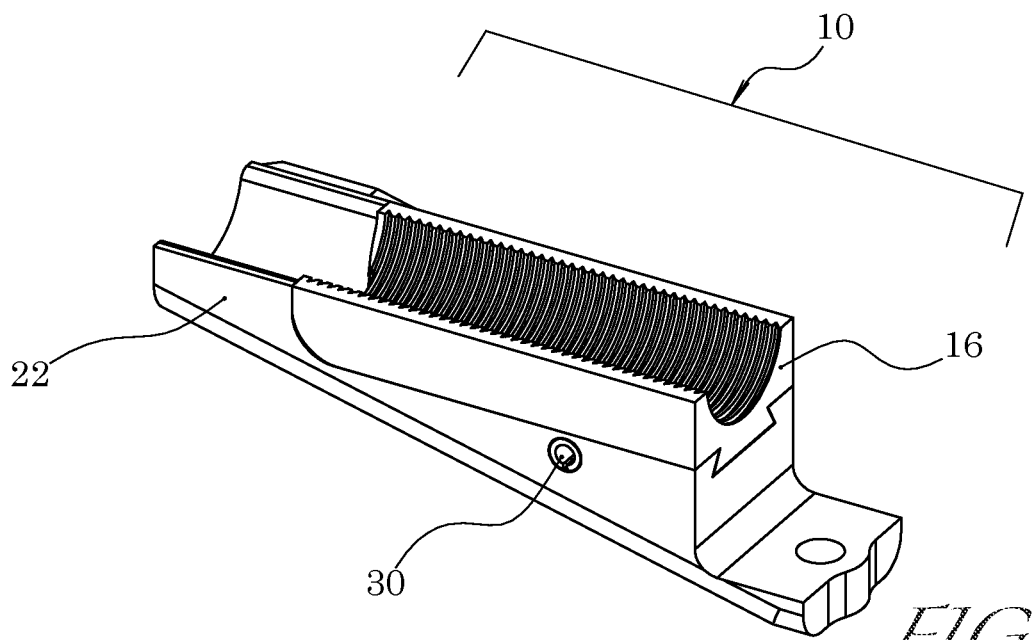
FIG. 5 is a perspective view of the cable gripper member of FIG. 4, with the gripper insert integrated into the gripper base.
Figure 6:
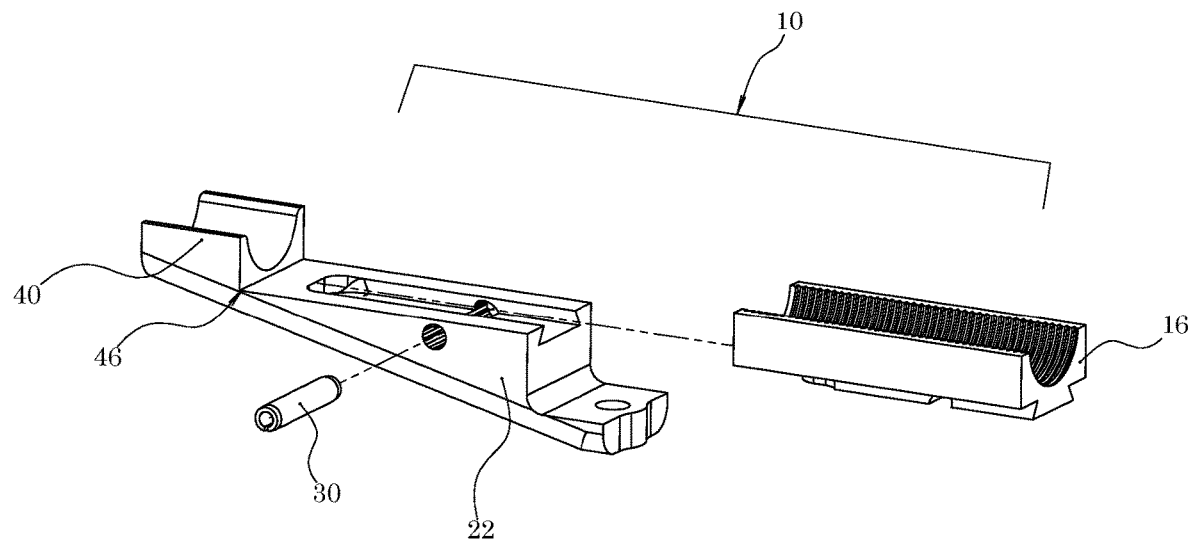
FIG. 6 is an exploded view of a cable gripper member comprising a gripper insert according to another embodiment of the present disclosure.
Figure 7:
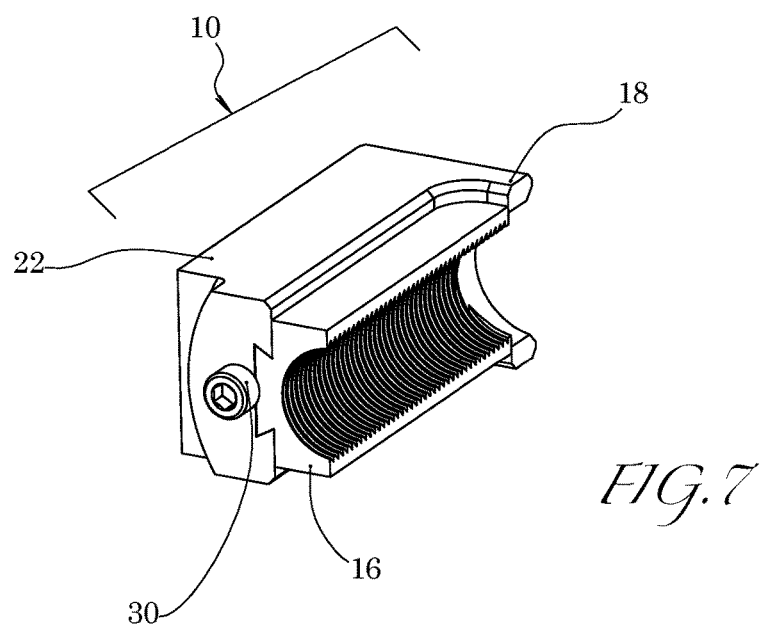
FIG. 7 is a perspective view of a cable gripper member comprising a gripper insert according to another embodiment of the present disclosure.
Figure 8A:
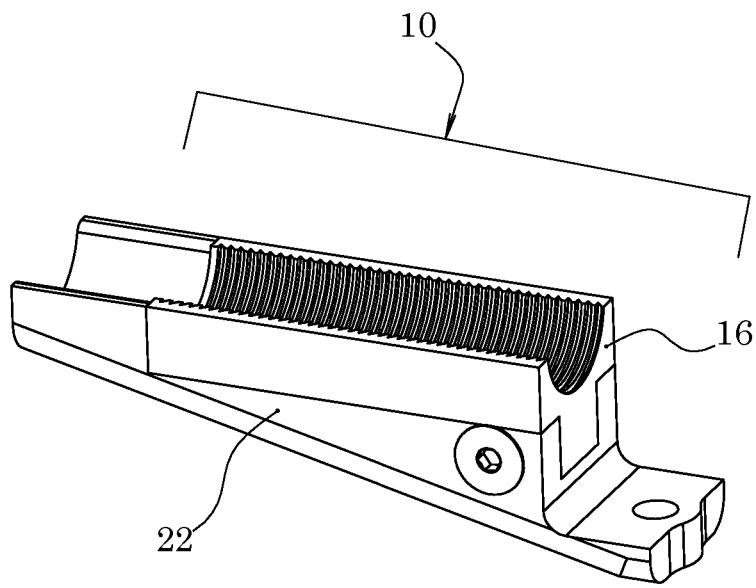
FIGS. 8A and 8B are views a cable gripper member comprising a gripper insert according to another embodiment of the present disclosure, where 8A is a perspective view showing the insert integrated into the gripper base and 8B is an exploded view of the gripper member in view 8A.
Figure 8B:
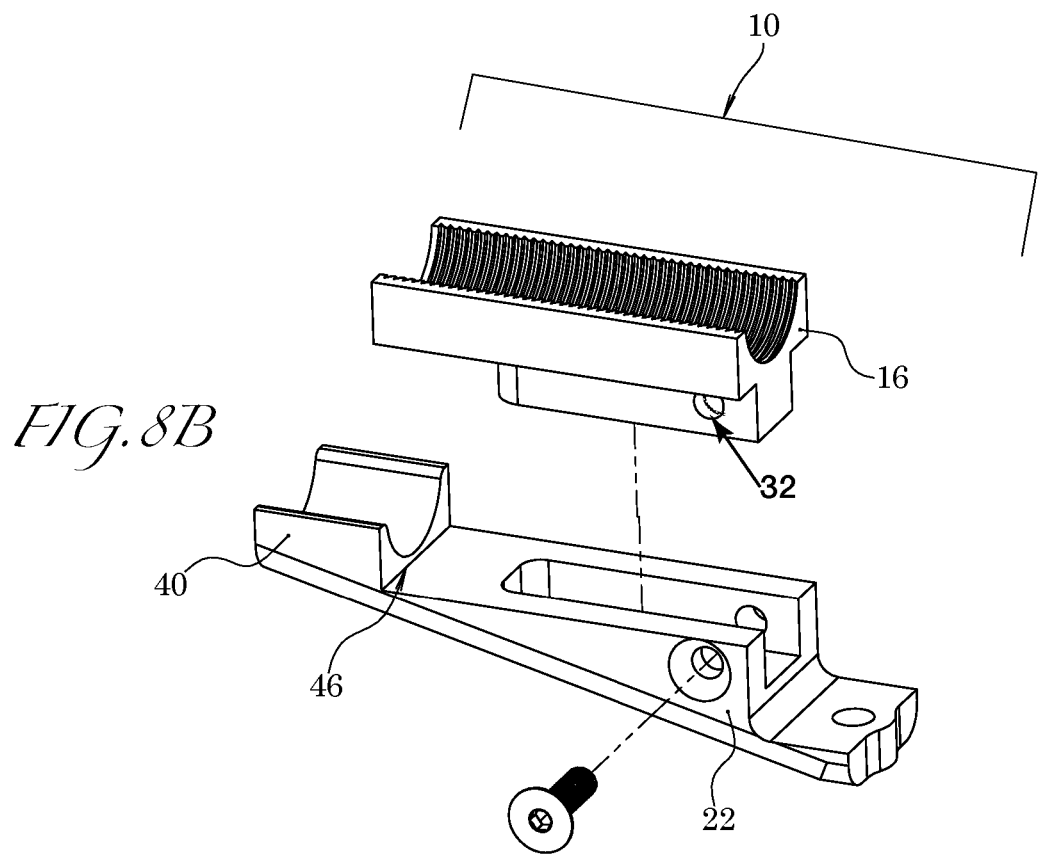

Additional mechanical insert position retaining means 30 also can be used to advantage. In FIGS. 4-6 a pin, such as a compressible spring or roll pin, is depicted as providing an additional mechanical means 30 for securing an insert in position. Position retaining means 30 can be used advantageously as one means for limiting longitudinal shifting or movement of insert 16 back along recess 20 and out from a free joint end on gripper base 22. In FIG. 7 the mechanical position retaining means 30 illustrated comprises a screw means positioned at the free joint end. In FIGS. 8A and 8B the mechanical position retaining means 30 illustrated comprises a bolting means. As will be appreciated by those having ordinary skill in the art, insert position retaining means can comprise any useful means, including a pin, bolt, screw or other affixing means. Additionally, and/or alternatively, fixatives such as, without limitation, epoxy or silicone also can be used to advantage.

In FIGS. 4 and 6 mechanical position retaining means 30 fits through a hollow channel formed by a lateral gap 32 that traverses the dovetail extending down from insert 16's outer surface 26 and a corresponding lateral gap that traverses recess 20 in gripper base 22, from pinhole opening 34. When the dovetail and recess are joined, the two gaps together form a hollow channel into which the pin can be inserted and engaged. As will be appreciated by those having ordinary skill in the art, a fabricator can adjust the depth of the dovetail as desired and allowed by size constraints, utilize larger or smaller mechanical position retaining means 30, and position them at different locations, including positions such that retaining means 30 occurs entirely within each dovetail. In FIG. 7, for example, mechanical position retaining means 30 occurs at the free end of a dove tail type joint located at the posterior or back end of the gripper base.

As will be appreciated by those having ordinary skill in the art, a wide variation and range of mechanical engaging and/or locking means are available and can be fabricated without undue experimentation. A similar range of options exist for mechanical position retaining means. The actual selection made by a fabricator will depend on standard calculations and decisions made that include, without limitation, the size and number of inserts to be used, the desired dimensions of the insert and gripper base, the location and function of the gripper in the cable pulling apparatus, the type of materials selected for both the base and the inserts, and the pull and thrust forces the gripper base and inserts will experience.

Figure 9A:
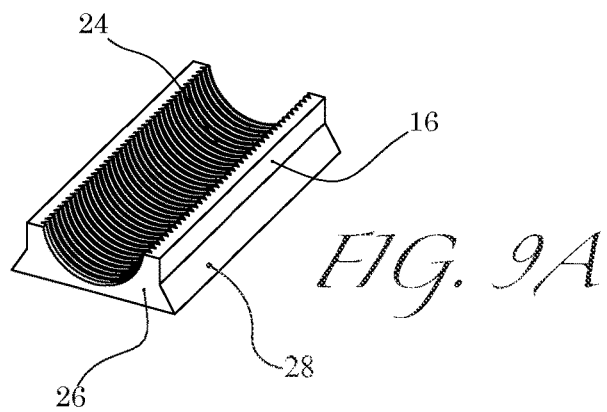
FIGS. 9A and 9B are perspective views of cable gripper inserts according to different embodiments of the present disclosure.
Figure 9B:
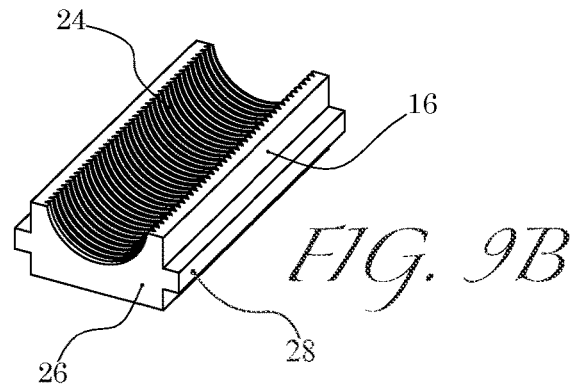
Figure 10:
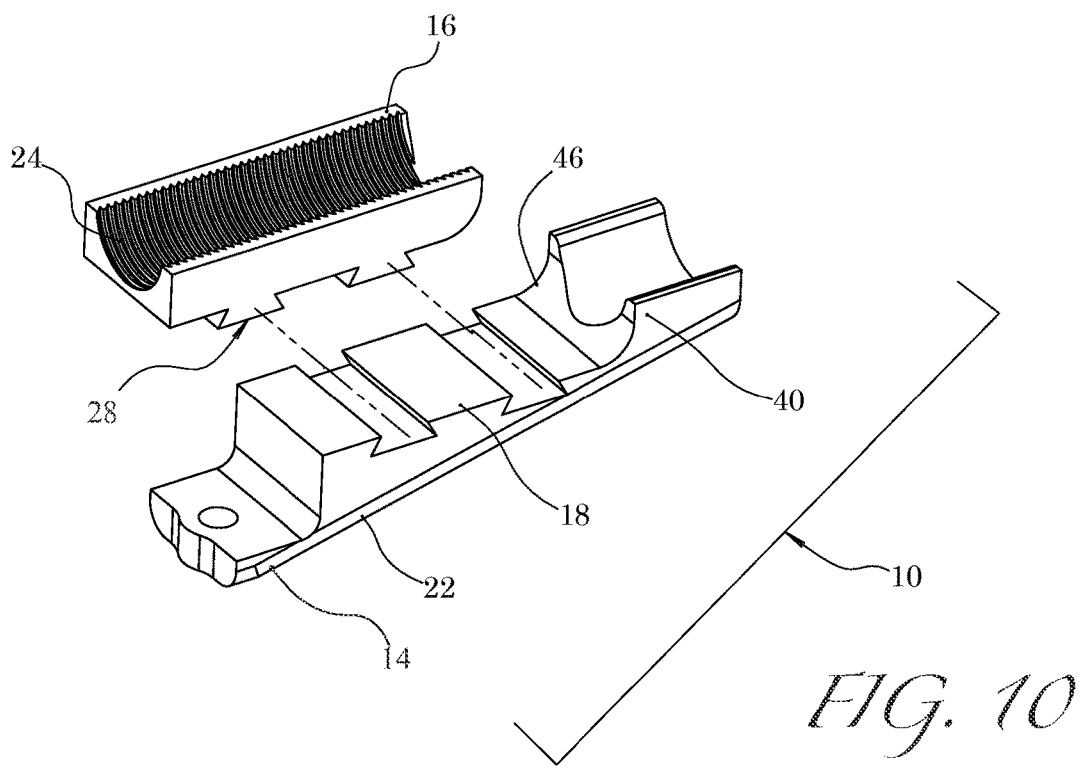
FIG. 10 is an exploded view of a cable gripper member comprising a gripper insert according to another embodiment of the present disclosure.

For example, FIGS. 8A and 8B illustrate yet another exemplary embodiment where the mechanical engaging means comprises a mortise and tenon type joint, together with a laterally located mechanical position retaining means. Other useful exemplary mechanical engaging or lock means include tongue and groove type joints. FIG. 10 illustrates still another exemplary embodiment comprising laterally positioned sliding dovetail type joints that traverse the width of insert 16 and gripper base 22. FIGS. 9A and 9B illustrate still other exemplary gripper insert embodiments where the mechanical locking means comprises a pair of parallel, opposing dovetails (FIG. 9A), or joint tongues (FIG. 9B) that extend out from the sides of insert 16. These parallel, opposing extensions 28 on insert 16 join corresponding parallel, opposing channels in the walls of the gripper base recess, the channels dimensioned to mirror and receive insert 16's parallel, opposing extensions.

As will be appreciated by those of ordinary skill in the art, where the cable gripping surface of a gripper member comprises a removable insert, the cable pulling force, which can exert pressures anywhere in the range of least about 5,000-100,000 lbs, will pull on the insert itself. Accordingly, bracing means for absorbing and translating the pressure from the inset to the gripper body are advantageous to prevent movement of the insert forward along the gripper base recess during operation. Where multiple, smaller inserts are utilized as illustrated in FIGS. 1-3 and 10, dividers 18 can provide the bracing means. Where a single insert is utilized, for example as illustrated in FIGS. 4-9, mechanical bracing means can advantageously be provided by means of a shelf 40. See, for example, FIGS. 4, 6, and 8B.

The length, depth, and thickness of the mechanical bracing means selected will depend, as above, on the size and length of the gripper base and insert chosen, gripper function, selected component materials, and operational cable pulling pressures, among other criteria. Using standard calculations a fabricator can readily calculate the desired dimensions for shelf 40 to provide the desired bracing functionality. Similarly, as also will be appreciated by those having ordinary skill in the art, corner joint 46 between shelf wall 42 and shelf floor 44 (see, for example, FIGS. 4, 6, and 8B) can comprise a possible stress point when absorbing cable pulling pressures. Accordingly, the choice of angle radius selected for joint 46 can depend on the available thickness of gripper base lower surface 14, particularly in the vicinity of joint 46. Where a gripper base has sufficient thickness and load bearing capacity to absorb operational cable pulling pressures, shelf joint 46 can comprise a substantially 90° angle (see, for example, FIGS. 5 and 8B). For thinner gripper bases, a shelf joint 46 preferably can be calculated as a radius to prevent unwanted deforming, bending or flexing at that point (see, for example, FIG. 4). The desired radius can be calculated readily using standard stress analysis calculations, taking into account, for example, metal hardness, gripper dimensions and operational pressures.

It will be appreciated by those having ordinary skill in the art that, provided with this disclosure, means now are provided for fabricating cable gripper jaws of multiple, different metals. In particular, it now is available to the fabricator to select a metal of a desired hardness for enhanced or preferred cable gripping capability, without compromising the load bearing requirements of the gripper body or base. For example, in the field of horizontal directional drilling, including the pipe bursting and trenches pipe replacement industries, useful insert metals can include metals having a Rockwell rating greater than 62. Carbide steel, for example, may be used to advantage. Similarly, gripper bodies now can be fabricated of a metal having enhanced load bearing capacity. Such metals may have a Rockwell hardness rating of 41 or below. In addition, gripper body metals can now be selected in addition to E9310, and a greater range of metal curing or heat treatments now are available, including through hardening, if desired, as compared with case hardened steel. By selecting individual metals that best match the different function of the gripper body or base and the gripper insert, one can fabricate a gripper jaw of enhanced integrity, longevity and stability. Moreover, by providing means for replacing the cable gripping mechanism or means of a gripper jaw or gripper jaw component or member, the longevity of the gripper is enhanced and conserved because only the insert needs to be replaced in the event the gripping means or teeth become worn.

Installation and replacement of the insert is simple. Where the mechanical engaging means comprises a joint, including, for example a dovetail type joint, the insert can be readily slid into and out of the gripper base by engaging or disengaging the joining components of the insert and gripper base. Once the insert is engaged with the gripper base and in position, any position retaining means can be inserted, for example, by means of a hammer, punch, screwdriver or other standard means. To replace an insert, a position retaining means first can be extracted, e.g., by means of a punch, and then the insert can be slid out from the gripper base. Where the insert itself sits in a channel, for example as illustrated in FIGS. 1-3, insert 16 can be pressed into position in channel recess 20. If desired, additional means can be provided for further affixing the insert in position in the recess using, for example, epoxy or silicone. As the gripper insert's cable gripping surface gets worn down with use, the insert can be extracted or lifted from the base using, for example a punch or other standard tools, and a new insert installed in the recess.

Embodiments of this disclosure may be embodied in other specific forms without departing from the spirit or essential characteristics thereof. The present embodiments are therefore to be considered in all respects as illustrative and not restrictive, the scope of the disclosure being indicated by the appended claims rather than by the foregoing description, and all changes that come within the meaning and range of equivalency of the claims are therefore intended to be embraced therein. While illustrative embodiments have been illustrated and described, it will be appreciated that various changes can be made therein without departing from the spirit and scope of the disclosure.

The embodiments of the invention in which an exclusive property or privilege is claimed are defined as follows:

1. A cable gripper component comprising:
   a gripper base having an upper surface and an opposing lower surface along said gripper base longitudinal axis, said gripper base upper surface comprising a channel extending along a length of said gripper base longitudinal axis;
   a gripper insert having a textured, concave, cable engaging upper surface and an opposing lower surface along said gripper insert longitudinal axis, said opposing lower surface dimensioned to mirror and removably engage with said gripper base channel, and
   means for mechanically coupling said insert to said base channel such that when said gripper insert lower surface is engaged in said gripper base upper surface channel, said gripper insert provides the cable gripping surface of said gripper component.

2. The cable gripper component of claim 1 wherein said gripper base upper surface further is configured to contact at least one axial end of said gripper insert.

3. The cable gripper component of claim 2 wherein said gripper base contact configuration is competent to limit longitudinal movement of said insert relative to said base.

4. The cable gripper component of claim 1 wherein said gripper insert and said gripper base compositions have different metal hardness ratings.

5. The cable gripper component of claim 1 wherein said gripper base upper surface comprises a plurality of channels along said gripper base longitudinal axis and a plurality of said gripper inserts, each said insert having a lower surface dimensioned to mirror and removably engage with said gripper base channels.

6. A cable gripper insert for use in a cable gripper jaw, the insert having a textured, concave, cable engaging upper surface and an opposing lower surface along said gripper insert longitudinal axis, said opposing lower surface comprising a tail extending out from said lower surface and along said longitudinal axis and dimensioned to mirror and removably engage with a channel in a gripper base such that when said gripper insert lower surface tail is engaged in said gripper base channel, said gripper insert provides the cable gripping surface of said cable gripper jaw.

7. The cable gripper insert of claim 6 wherein the composition of said insert comprises carbide steel.

* * * * *